United States Patent
Primeaux, II

[11] Patent Number: 5,480,955
[45] Date of Patent: Jan. 2, 1996

[54] ALIPHATIC SPRAY POLYUREA ELASTOMERS

[75] Inventor: Dudley J. Primeaux, II, Elgin, Tex.

[73] Assignee: Huntsman Corporation, Salt Lake City, Utah

[21] Appl. No.: 117,962

[22] Filed: Sep. 7, 1993

Related U.S. Application Data

[63] Continuation of Ser. No. 402,296, Sep. 5, 1989, abandoned.

[51] Int. Cl.⁶ ............................ C08G 18/02; C08G 18/10
[52] U.S. Cl. ............................ 528/60; 528/61; 528/64; 528/67; 528/68; 528/76; 528/77
[58] Field of Search ............................ 528/60, 61, 64, 528/76, 68, 67, 77

[56] References Cited

U.S. PATENT DOCUMENTS

| | | | |
|---|---|---|---|
| 3,666,788 | 5/1972 | Rowton | 528/67 |
| 3,714,128 | 1/1973 | Rowton et al. | 528/60 |
| 4,705,814 | 11/1987 | Grigsby et al. | 521/159 |
| 4,806,615 | 2/1989 | Rice et al. | 528/68 |
| 4,902,768 | 2/1990 | Gerkin | 528/68 |
| 5,140,090 | 8/1992 | Champion et al. | 528/60 |
| 5,171,818 | 12/1992 | Wilson | 528/59 |

Primary Examiner—John Kight, III
Assistant Examiner—Shelley A. Dodson
Attorney, Agent, or Firm—Russell R. Stolle; James H. Laughlin, Jr.

[57] ABSTRACT

An aliphatic spray polyurea elastomer is disclosed. The elastomer comprises an (A) and (B) component. The (A) component includes an aliphatic isocyanate. The (B) component includes an amine terminated polyoxyalkylene polyol and an amine terminated aliphatic chain extender.

11 Claims, No Drawings

ALIPHATIC SPRAY POLYUREA ELASTOMERS

This application is a continuation of application No. 07/402,296, filed Sept. 5, 1989, now abandoned.

BACKGROUND OF THE INVENTION

1. Field of the Invention

The present invention relates to aliphatic spray polyurea elastomers.

2. Description of Background Art

Spray elastomer systems are commonly recognized as coating materials, with spray polyurea elastomer systems being particularly useful when employed in this capacity. One of the shortcomings associated with aromatic spray polyurea elastomer systems, which generally are prepared by reacting an aromatic isocyanate with an active hydrogen component in the presence of an aromatic chain extender, is that they exhibit poor stability when exposed to ultraviolet radiation. This becomes particularly problematic when the substrate to be coated, for example, a rooftop, is continuously subjected to ultraviolet exposure. The resulting ultraviolet degradation of the elastomer system is typically manifested by a change in color; a general loss of product integrity, such as cracking; and an adverse reduction in properties, such as tensile strength, tear strength and elongation to name a few.

The most widely employed aromatic chain extender is diethylenetoluenediamine (DETDA), a product of Ethyl Corp. In addition to providing an ultraviolet unstable system, DETDA provides a rigid elastomer system which, because of the rigidity, has difficulty in assuming the detail or contour of the substrate to be coated. However, polyurea spray elastomer systems fabricated from, among other things, DETDA generally exhibit good processing characteristics. Thus, there is a recognized need for a spray polyurea elastomer system that exhibits ultraviolet stability and increased flexibility, i.e., less rigidity, while exhibiting good processing characteristics.

To provide an ultraviolet stable system, however, non-aromatic, i.e., aliphatic, components should be employed. For instance, Rowton, R. L., CYANOETHYLATED POLYOXYPROPYLENE-POLYAMINES: POLYMER FORMERS OF UNIQUE REACTIVITY, Journal of Elastomers and Plastics, Vol.9, October 1977, describes cyanoethylated polyoxpropylenepolyamines as the hydrogen component in polyurea systems to provide light stable systems. Rowton is silent with respect to employing aliphatic chain extenders.

Some of the known aliphatic chain extenders include 1,4-diaminocyclohexane and 1,6-diaminohexane. These and other known aliphatic chain extenders react very rapidly with isocyanate and, therefore, cannot be used in spray systems, inasmuch as polymerization occurs so rapidly that the polymer is virtually unsprayable. Therefore, it is to be noted that the advantage provided by the present invention is primarily exhibited in spray systems and is less noteworthy in other elastomer systems where sprayability is not at issue, such as reaction injection molding (RIM) systems.

Additionally, spray elastomer systems prepared with known aliphatic chain extenders have notoriously exhibited processing characteristics inferior to those exhibited by systems fabricated from DETDA.

U.S. Pat. No. 3,666,788 is directed to cyanoalkylated polyoxyalkylene polyamines which are specifically described as being useful as curing agents in polyurea coatings. Similarly, U.S. Pat. No. 3,714,128 describes cyanoalkylated polyoxyalkylene polyamines which are useful for slowing the gelling or hardening of the polyurea component so that good mixing of the isocyanate and amine components can be attained, which gives the sprayed material ample time to adhere and level before gelation of the polyurea coating occurs. Neither of these patents describe the polyoxyalkylene polyamines as chain extenders in aliphatic polyurea spray elastomer systems.

Polyoxyalkylene polyamines, particularly JEFFAMINE® T-403, D-400 and D-130 are described as chain extenders in U.S. Pat. No. 4,732,919; however, this patent relates to an aromatic system which is to be used in a RIM application.

Thus, it is my understanding that an aliphatic spray polyurea elastomer system which incorporates the particular aliphatic chain extenders described hereinbelow and which exhibits ultraviolet stability, increased flexibility and favorable processing characteristics has heretofore been unavailable.

SUMMARY OF THE INVENTION

Accordingly, the present invention relates to an aliphatic spray polyurea elastomer which comprises an (A) component and a (B) component. The (A) component includes an aliphatic isocyanate. The isocyanate of the (A) component preferably comprises a quasi-prepolymer of an aliphatic isocyanate and a material selected from at least one polyol, a high molecular weight polyoxyalkyleneamine or a combination of these materials. The (B) component includes (1) an amine terminated polyoxyalkylene polyol and (2) an amine terminated aliphatic chain extender.

It has advantageously been discovered that the spray polyurea elastomer system of the present invention is ultraviolet stable, exhibits increased flexibility and possesses favorable processing characteristics. Additionally, the low temperature elongation and green strength of the present spray polyurea elastomer system are extremely good. Furthermore, since the present elastomer system is 100 percent solids, no solvent is required to promote spraying.

DESCRIPTION OF THE PREFERRED EMBODIMENTS

The aliphatic spray polyurea elastomer system of the present invention generally includes two components, an (A) component and a (B) component. In particular, the (A) component includes an aliphatic isocyanate. The aliphatic isocyanates employed in component (A) are those known to one skilled in the art. Thus, for instance, the aliphatic isocyanates are of the type described in U.S. Pat. No. 4,748,192. Accordingly, they are typically aliphatic diisocyanates, and, more particularly, are the trimerized or the biuretic form of an aliphatic diisocyanate, such as, hexamethylene diisocyanate, or the bifunctional monomer of the tetraalkyl xylene diisocyanate, such as, the tetramethyl xylene diisocyanate. Cyclohexane diisocyanate is also to be considered a preferred aliphatic isocyanate. Other useful aliphatic polyisocyanates are described in U.S. Pat. No. 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as, 1,3 and 1,4-cyclohexane diisocyanate as well as any desired mixture of these isomers, 1-isocyanato-3,3,5-trimethyl-5-isocyanatomethylcyclohexane(isophorone diisocyanate); 4,4'-,2,2'- and 2,4'-dicyclohexylmethane diisocyanate as well as the corresponding isomer mixtures, and the like. The aforestated isocyanates can be used alone or in combination.

It is to be understood that the term aliphatic isocyanate also includes quasi-prepolymers of aliphatic isocyanates with active hydrogen containing materials. The active hydrogen containing materials can include a polyol or a high molecular weight polyoxyalkyleneamine, also described hereinbelow as amine terminated polyethers, or a combination of these materials.

The polyols include polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. Other high molecular weight polyols which may be useful in this invention are polyesters of hydroxyl terminated rubbers, e.g., hydroxyl terminated polybutadiene. Hydroxyl terminated quasi-prepolymers of polyols and isocyanates are also useful in this invention.

Especially preferred are amine terminated polyether polyols, including primary and secondary amine terminated polyether polyols of greater than 1,500 average molecular weight having from about 2 to about 6 functionality, preferably from about 2 to about 3, and an amine equivalent weight of from about 750 to about 4,000. Mixtures of amine terminated polyethers may be used. In a preferred embodiment the amine terminated polyethers have an average molecular weight of at least about 2,500. These materials may be made by various methods known in the art.

The amine terminated polyether resins useful in this invention, for example, are polyether resins made from an appropriate initiator to which lower alkylene oxides, such as ethylene oxide, propylene oxide, butylene oxide or mixtures thereof, are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which is incorporated herein by reference.

In the practice of this invention, a single high molecular weight amine terminated polyol may be used. Also, mixtures of high molecular weight amine terminated polyols, such as mixtures of di- and trifunctional materials and/or different molecular weight or different chemical composition materials, may be used.

Also, high molecular weight amine terminated polyethers or simply polyether amines are included within the scope of my invention and may be used alone or in combination with the aforestated polyols. The term high molecular weight is intended to include polyether amines having a molecular weight of at least about 2000. Particularly preferred are the JEFFAMINE series of polyether amines available from Texaco Chemical Company; they include JEFFAMINE D-2000, JEFFAMINE D-4000, JEFFAMINE T-3000 and JEFFAMINE T-5000. These polyether amines are described with particularity in Texaco Chemical Company's product brochure entitled THE JEFFAMINE POLYOXYALKYLENEAMINES.

The (B) component of the present spray polyurea elastomer system includes an amine terminated polyoxyalkylene polyol and an amine terminated aliphatic chain extender. The amine terminated polyoxyalkylene polyol is preferably selected from diols or triols and, most preferably, includes a blend of diols and/or triols. The particular polyols, i.e., diols and/or triols, employed in component (B) are the same as those described hereinabove in connection with the quasi-prepolymer of component (A).

The amine terminated chain extenders of component (B) are generally described as low molecular weight polyoxyalkylene polyamines which contain terminal amine groups. One particular chain extender is represented by the formula:

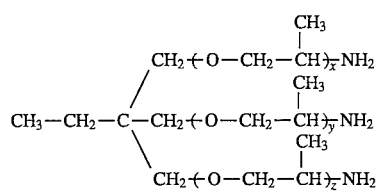

wherein x+y+z has a value of about 5.3. The average amine hydrogen equivalent weight is about 67 and the product is commercially available from Texaco Chemical Company as JEFFAMINE T-403.

Another related polyoxypropylene polyamine chain extender is represented by the formula:

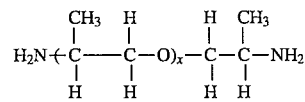

wherein x has a value of about 5.6. This product has an average amine hydrogen equivalent weight of about 100 and is commercially available from Texaco Chemical Company as JEFFAMINE D-400. The product having the same formula as above wherein x has an average value of about 2.6 is useful. This product has an average amine hydrogen equivalent weight of about 57.5 and is commercially available from Texaco Chemical Company as JEFFAMINE D-230.

These aliphatic chain extenders give the elastomer system the requisite activity to yield good cure and good spray processing characteristics. Additionally, the thus formed aliphatic system is ultraviolet stable and exhibits improved flexibility so that it can be effectively sprayed onto even the most intricately shaped substrate.

Other conventional formulation ingredients may be employed in component (A) or (B) as needed, such as, for example, foam stabilizers, also known as silicone oils or emulsifiers. The foam stabilizers may be an organic silane or siloxane. For example, compounds may be used having the formula:

$$RSi[O—(R_2SiO)_n—(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773. Pigments, for example titanium dioxide, may be incorporated in the elastomer system, preferably in the (B) component, to impart color properties to the elastomer.

Reinforcing materials, if desired, useful in the practice of our invention are known to those skilled in the art. For example, chopped or milled glass fibers, chopped or milled carbon fibers and/or other mineral fibers are useful.

Post curing of the elastomer of the invention is optional. Post curing will improve some elastomeric properties, such as heat sag. Employment of post curing depends on the desired properties of the end product.

The (A) component and (B) component of the present spray polyurea elastomer system are combined or mixed under high pressure; most preferably, they are impingement mixed directly in the high pressure spray equipment, which is, for example, a GUSMER H-V proportioner fitted with a GUSMER Model GX-7 spray gun. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then coated onto the desired substrate via the spray gun.

The volumetric ratio of the (A) component to the (B) component is generally from about 30 to 70 percent to about 70 to 30. Preferably, component (A) and component (B) are employed in a 1:1 volumetric ratio.

Advantageously, the (A) and (B) components react to form the present elastomer system without the aid of a catalyst.

GLOSSARY OF TERMS AND MATERIALS

TEXOX PPG-2000—Polypropylene oxide of about 2000 molecular weight; a product of Texaco Chemical Co.

JEFFAMINE T-5000—Polypropylene oxide triamine of about 5000 molecular weight; a product of Texaco Chemical Co.

JEFFAMINE T-3000—Polypropylene oxide triamine of about 3000 molecular weight; a product of Texaco Chemical Co.

JEFFAMINE D-4000—Polypropylene oxide diamine of about 4000 molecular weight; a product of Texaco Chemical Co.

JEFFAMINE D-2000—Polypropylene oxide diamine of about 2000 molecular weight; a product of Texaco Chemical Co.

JEFFAMINE T-403, D-400 and D-230 are described with particularity hereinabove.

The following Examples I–X are provided to further illustrate preferred embodiments of the present invention and should not be construed as limiting the present invention in any way.

Examples I and II are provided to demonstrate that aliphatic polyurea elastomers can be produced by combining the above described components (A) and (B).

EXAMPLE I

The (A) component of an aliphatic polyurea elastomer was prepared by combining 60 parts of m-tetramethylxylene diisocyanate (m-TMXDI) with 40 parts of TEXOX PPG-2000. The (B) component was prepared by combining 15.8 parts of JEFFAMINE T-5000, 36.8 parts of JEFFAMINE D-2000 and 47.4 part of JEFFAMINE D-230. The (A) and (B) components were handmixed at a 1:1 volumetric ratio to produce an aliphatic polyurea elastomer.

EXAMPLE II

The (A) component of an aliphatic polyurea elastomer was prepared by combining 60 parts of m-TMXDI with 40 parts of JEFFAMINE D-2000. The (B) component was prepared in the same manner as in Example I. The (A) and (B) components were hand mixed at 1:1 volumetric ratio to produce an aliphatic polyurea elastomer with a gel time of approximately 20 seconds.

EXAMPLE III

The (A) component of an aliphatic spray polyurea elastomer was prepared by combining 55 parts of m-TMXDI with 45 parts of JEFFAMINE D-2000 to form a quasi-prepolymer. The (B) component was prepared by combining 17.1 parts of JEFFAMINE T-5000, 40 parts of JEFFAMINE D-2000 and 42.9 parts of JEFFAMINE D-230. The (A) and (B) components were mixed at a 1:1 volumetric ratio and at an (A):(B) weight ratio of 1.096. The (A) and (B) components were mixed a GUSMER H-V proportioner. The (A) component was maintained at a temperature of 160° F. and a pressure of 2800 psi, while the (B) component was maintained at a temperature of 150° F. and a pressure of 2000 psi. The mixed product was sprayed, via a GUSMER Model GX-7 spray gun, onto a stainless steel substrate which had been pretreated with a release agent. The release agent was prepared from a zinc stearate-sodium oleate combination which was dissolved in a water-isopropyl alcohol mixture. The aliphatic spray polyurea elastomer produced exhibited a gel time of about 20 seconds and was sticky which was attributed to the low index (1.05).

The physical properties of the elastomer produced in Example III were analyzed; the results are reported in Table I.

TABLE I

| | | |
|---|---|---|
| Avg. Thickness (in.) | | 0.056 |
| Tensile strength (psi) | | 689 |
| Elongation (%) | | 743 |
| Tear (p/i) | | 183 |
| Shore D hardness (0 sec/10 sec) | | 29/15 |
| Shore A hardness (0 sec/10 sec) | | 79/54 |
| Dart impact | 77° F. | −20° F. |
| ultimate force (lbs.) | 163 | 91 |
| ultimate energy (in.-lbs.) | 34 | 0 |
| yield force (lbs.) | 141 | 88 |
| yield energy (in.-lbs.) | 10 | 0 |
| total energy (in.-lbs.) | 40 | 0 |
| Moisture Vapour Transmission (permeation at 0.30 mils.) | | 0.077 |

EXAMPLE IV

The (A) component of the aliphatic spray polyurea elastomer of this example was prepared in accordance with Example III. The (B) Component was prepared by combining 15.58 parts of JEFFAMINE T-5000, 36.36 parts of JEFFAMINE D-2000, 20.78 parts of JEFFAMINE T-403 and 27.27 parts of JEFFAMINE D-230. The (A) and (B) components were mixed at a 1:1 volumetric ratio and at an (A):(B) weight ratio of 1.088. The (A) and (B) components were mixed and sprayed in the manner and under the conditions set forth in Example III. However, in this Example, four specimens of varying thickness were sprayed onto the stainless steel substrate. The physical properties of the elastomer produced in Example IV were tested for each of the four specimens. The thickness of each of the four specimens, as well as the data resulting from tests, are reported in Table II. The aliphatic spray polyurea elastomer produced exhibited a gel time of about 2.5 seconds.

TABLE II

| Specimen No. | IV-1 | IV-2 | IV-3 | IV-4 |
| --- | --- | --- | --- | --- |
| Avg. thickness (in.) | 0.036 | 0.049 | 0.064 | 0.095 |
| Tensile strength (psi) | 844 | 1302 | 1357 | 1272 |
| Elongation (%) | 607 | 540 | 490 | 437 |
| Elongation (%) (−20° F.) | 350 | 275 | — | — |
| Tear (pli) | 212 | 257 | 259 | 280 |
| Shore D hardness (0/10 secs.) | 30/18 | 26/18 | 41/29 | 40/29 |
| Shore A hardness (0/10 secs.) | 77/60 | 64/54 | 74/69 | 74/69 |
| MVT, perms @ 30 mils | 0.066 | 0.045 | 0.051 | 0.059 |
| Dart Impact | 77/−20° F. | 77/−20° F. | 77/−20° F. | 77/−20° F. |
| Ultimate force (lbs) | 136/91 | 191/126 | 208/95 | 273/156 |
| Ultimate energy (in-lbs) | 22/1 | 41/9 | 43/6 | 65/10 |
| Yield force (lbs) | 111/91 | 175/116 | 189/83 | 345/144 |
| Yield energy (in-lbs) | 4/1 | 19/5 | 21/3 | 36/6 |
| Total energy (in-lbs) | 30/1 | 46/17 | 50/11 | 78/14 |

EXAMPLES V–VII

The (A) component of the aliphatic spray polyurea elastomer produced in Examples VI, VI and VII was prepared in accordance with Example III. The (B) component of these elastomers was prepared by combining 10.5 parts of JEFFAMINE T-5000, 41.6 parts of JEFFAMINE D-2000, 20.8 parts of JEFFAMINE T-403 and 26.7 parts of JEFFAMINE D-230. The (B) component also included the following:

Example V—(0.4) parts Reactint Black;

Example VI—(0.4) parts Reactint Blue; and

Example VII—(0.4) parts Reactint Red.

The (A) and (B) components of Examples V, VI and VII were mixed and sprayed in the manner and under the conditions set forth in Example III. The volumetric ratio of component (A) to component (B) was 1:1 and the (A):(B) weight ratio was 1.085. Each of the elastomers produced in Examples V–VII exhibited a gel time of 2.5 seconds and an index of 1.05; a very slight initial tackiness was noted in each elastomer. Certain physical properties of the elastomers produced in Examples V–VII were analyzed; the results are reported in Table III.

TABLE III

| Example No. | V | VI | VII |
| --- | --- | --- | --- |
| Properties Tested at 77° F. | | | |
| Tensile strength (psi) | 1168 | 1133 | 1251 |
| Elongation (%) | 448 | 434 | 431 |
| Tear (pli) | 210 | 223 | 267 |
| Hardness, Shore D (0 sec) | 37 | 36 | 36 |
| MVT, perms @ 30 dry mils | 0.0593 | 0.0565 | 0.0558 |
| Abrasion resistance (1000 gm, 1000 rev, H-18 wheels) wt loss in mg | 237 | 377 | 516 |
| Low temperature properties (−20° F.) | | | |
| Tensile strength (psi) | 1534 | 1466 | 1645 |
| Elongaton (%) | 350 | 402 | 391 |
| Tear (pli) | 571 | 479 | 701 |

The (A) and (B) components of the aliphatic spray polyurea elastomer of this example were prepared, mixed and sprayed in accordance with Examples V–VII except that in this example no Reactint Black (Ex.V), Blue (Ex. VI) or Red (Ex.VII) were employed.

EXAMPLE IX

The (A) component of the aliphatic spray polyurea elastomer produced in this example was prepared in accordance with Example III. The (B) component was prepared by combining 9.96 parts of JEFFAMINE T-5000, 39.84 parts of JEFFAMINE D-2000, 19.92 parts of JEFFAMINE T-403, 26.15 parts of JEFFAMINE D-230 and 4.13 parts of titanium dioxide. The (A) and (B) components were mixed at a 1:1 volumetric ratio and at an (A):(B) weight ratio of 1.064. The index was 1.07. The resulting white aliphatic spray polyurea elastomer had a gel time of 2.0 seconds.

EXAMPLE X

The (A) component of the aliphatic spray polyurea elastomer produced in this example was prepared in accordance with Example III. The (B) component was prepared by combining 11.27 parts of JEFFAMINE T-3000, 45.07 parts of JEFFAMINE D-2000, 16.9 parts of JEFFAMINE T-403 and 26.76 parts of JEFFAMINE D-230. The (A) and (B) components were mixed at a 1:1 volumetric ratio and at (A):(B) weight ratio of 1.085. The index was 1.10. The resulting aliphatic spray polyurea elastomer had a gel time of 2.0 seconds.

The physical properties of the aliphatic spray polyurea elastomers produced in Examples VIII–X were analyzed; the results are reported in Table IV.

TABLE IV

| Example No. | VIII | IX | X |
| --- | --- | --- | --- |
| Properties tested at 77° F. | | | |
| Tensile strength (psi) | 970 | 1295 | 1245 |
| Elongation (%) | 425 | 420 | 480 |
| Tear (pli) | 210 | 250 | 210 |
| Hardness, Shore D (0 secs.) | 39 | 36 | 38 |
| MVT, perms @ 30 dry mils | 0.05 | 0.06 | 0.06 |
| Abrasions resistance, wt loss mg (1000 gm, 1000 rev, H-18 wheels) | 320 | 470 | 460 |

TABLE IV-continued

| Example No. | VIII | IX | X |
|---|---|---|---|
| Low temperature properties (−20° F.) | | | |
| Tensile strength (psi) | 1330 | 1665 | 1560 |
| Elongation (%) | 310 | 350 | 350 |
| Tear (pli) | 595 | 600 | 605 |

As these data demonstrate, the aliphatic spray polyurea elastomers of the present invention exhibit excellent green strength and low temperature elongation properties.

What is claimed is:

1. An aliphatic spray polyurea elastomer comprising an (A) component which includes an aliphatic isocyanate and a (B) component which includes (1) a primary amine terminated polyoxyalkylene polyol having a molecular weight of at least about 2000 and an amine equivalent weight of at least about 750 and (2) a primary amine terminated polyoxyalkylene chain extender selected from a compound represented by the formula:

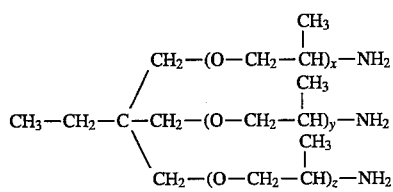 (i)

wherein x+y+x z has a value of about 5.3 and wherein the average amine hydrogen equivalent weight is about 67;

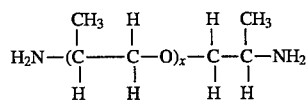 (ii)

wherein x has a value of about 5.6 and wherein the average amine hydrogen equivalent weight is about 100;

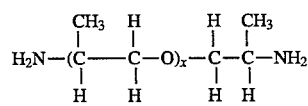 (iii)

wherein x has a value of about 2.6 and wherein the average amine hydrogen equivalent weight is about 57.5; or (iv) a combination of at least two of compounds (i), (ii) and (iii).

2. The elastomer of claim 1 wherein said aliphatic isocyanate is selected from the group consisting of hexamethylene diisocyanate, cyclohexane diisocyanate, 1,12-dodecane diisocyanate, 1,4-tetramethylene diisocyanate, isophorone diisocyanate, dicyclohexylmethane diisocyanate and mixtures thereof; and an active hydrogen containing material selected from at least one polyol, a high molecular weight polyoxyalkyleneamine or a combination thereof.

3. The elastomer of claim 1 wherein said aliphatic isocyanate comprises a quasi-prepolymer of a bifunctional monomer of tetraalkyl xylene diisocyanate and an active hydrogen containing material selected from at least two polyols or a combination of at least one polyol and a high molecular weight polyoxyalkyleneamine.

4. The elastomer of claim 1 wherein said aliphatic isocyanate comprises a quasi-prepolymer of an aliphatic isocyanate and an active hydrogen containing material selected from at least one polyol, a high molecular weight polyoxyalkyleneamine or a combination thereof.

5. The elastomer of claim 4 wherein said at least one polyol and said amine terminated polyoxyalkylene polyol of component (B) comprise polyether polyols or polyester polyols having an equivalent weight of at least about 500.

6. The elastomer of claim 5 wherein said polyester polyols are polyesters of hydroxyl terminated rubbers.

7. The elastomer of claim 5 wherein said polyether polyols are selected from the group consisting of polyols based on trihydric initiators having a molecular weight of at least about 4000; amine terminated polyether polyols having an average molecular weight greater than 1500, a functionality of from about 2 to about 6 and an amine equivalent weight of from about 750 to about 4000; and mixtures thereof.

8. The elastomer of claim 7 wherein the functionality of said polyether polyols is from about 1 to about 3.

9. The elastomer of claim 5 wherein said amine terminated polyoxyalkylene polyol of component (B) is selected from diols, triols or blends thereof.

10. The elastomer of claim 1 further comprising pigments and reinforcing materials, said reinforcing materials being selected from milled or chopped glass fibers or mineral fibers.

11. The elastomer of claim 1 wherein the volumetric ratio of the (A) component to the (B) component is from about 30 to 70 percent of the (A) component to about 70 to 30 percent of the (B) component.

* * * * *